(12) United States Patent
Lee et al.

(10) Patent No.: US 8,640,544 B2
(45) Date of Patent: Feb. 4, 2014

(54) METHOD FOR ANALYZING STRUCTURE SAFETY

(75) Inventors: Wei-Feng Lee, Taipei (TW); Cheng-Hsing Chen, Taipei (TW); Yi-Chun Lai, Taipei (TW); Hsing-Tai Mei, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 237 days.

(21) Appl. No.: 13/216,243

(22) Filed: Aug. 24, 2011

(65) Prior Publication Data

US 2012/0204646 A1 Aug. 16, 2012

(30) Foreign Application Priority Data

Feb. 10, 2011 (TW) .............................. 100104421 A

(51) Int. Cl.
*G01N 29/46* (2006.01)
*G01N 29/12* (2006.01)
*G01H 13/00* (2006.01)

(52) U.S. Cl.
USPC ................................ 73/579; 73/587; 73/594

(58) Field of Classification Search
USPC .......................................... 73/579, 587, 594
See application file for complete search history.

(56) References Cited

U.S. PATENT DOCUMENTS

| | | | | |
|---|---|---|---|---|
| 4,164,149 A * | 8/1979 | Okubo | ........................... | 73/594 |
| 4,894,787 A * | 1/1990 | Flannelly et al. | ............... | 702/42 |
| 5,255,565 A * | 10/1993 | Judd et al. | ...................... | 73/579 |
| 6,006,163 A * | 12/1999 | Lichtenwalner et al. | ....... | 702/36 |
| 2005/0096873 A1* | 5/2005 | Klein | ........................... | 702/184 |
| 2005/0165588 A1* | 7/2005 | Iwan et al. | ........................ | 703/2 |
| 2008/0033695 A1* | 2/2008 | Sahara et al. | ................. | 702/185 |
| 2009/0090185 A1* | 4/2009 | Puttmer | .......................... | 73/587 |
| 2012/0253707 A1* | 10/2012 | Qi | ................................... | 702/56 |

FOREIGN PATENT DOCUMENTS

JP 2000186984 A * 7/2000

* cited by examiner

*Primary Examiner* — Peter Macchiarolo
*Assistant Examiner* — Rose M Miller

(57) ABSTRACT

The present invention discloses a method for analyzing structure safety, and the method uses valid vibration measurement signals to obtain mutual feedbacks for a structural model analysis and a calibrated structural model to simulate a disaster situation to obtain the critical force exertion and deformation scale of a structure. The method is applied to capture the stability index of the structure to analyze the structure safety or applied for a structure safety evaluation or a health monitoring, or even for a structure multi-hazards safety determination.

3 Claims, 4 Drawing Sheets

METHOD FOR ANALYZING STRUCTURE SAFETY

CROSS-REFERENCE TO RELATED APPLICATION

This application claims foreign priority from a Taiwan Patent Application, Ser. No. 100104421, filed on Feb. 10, 2011.

BACKGROUND OF THE INVENTION

1. Field of the Invention

The present invention relates to a method for analyzing structure safety that can be applied to the multi-hazard safety monitoring and long-term behavior evaluation of an infrastructure such as a bridge, a mass rapid transit, a rail, a water conservation facility, and a side slope. In particular, a measured vibration signal is used to simulate a disaster situation by calibrating the mutual feedback of a structural model, and obtain the critical force exertion and the deformation scale of the structure to evaluate the safety of the structure.

2. Brief Description of the Related Art

Most of the rivers in Taiwan are steep and come with rapid currents, plus the impact of floods caused by heavy rains and typhoons each year, and disaster damages to infrastructures such as bridges, mass rapid transits, rails, water reservation facilities, and side slopes occur frequently.

At present, the studies and technologies for evaluating the safety of a structure adopt a single device, method or process as the base. For example, a "non-destructive structure safety inspection method" as disclosed in R.O.C. Pat. No. 381177 adopts load devices installed at a multiple of points on a bridge deck, and use vibrations produced by striking to reflect different frequency response positions to locate a damaged position of a bridge. An "apparatus for diagnosing and evaluating seismic safety of a building" as disclosed in R.O.C. Pat. No. M302594 uses a decision flow and apparatus to analyze the level of a crack, corrosion, termite rot, or water seepage of a building. A "Construction structure safety testing method" as disclosed in R.O. C. Pat. Publication No. 200741201 comprises one or more wireless intelligent sensors installed on a testing structure for detecting a vibration frequency of the structure, and the vibration frequency is computed and transmitted to another wireless intelligent sensor and then to a remote host computer for its processing, so as to produce data and check the data to determine whether or not the structure is weakened. An "instant safety monitoring system for rail transportation" as disclosed in R.O. C. Pat. Publication No.200848299 comprises a plurality of sensors installed at selected monitoring points of a rail for measuring a vibration signal produced by a vehicle passing through the selected monitoring points wherein the vibration sensors are installed on the rail, and determining an abnormal condition of the rail according to the obtained monitoring parameter and a migration of the natural frequency of the selected monitoring point. As disclosed in U.S. Pat. No. 6,192,758, a "structure safety inspection method" is provided for inspecting damages of a bridge structure, wherein a testing body is placed on a bridge first, and then a motor vehicle is driven and passed over the bridge, and the level of influence of vibrations produced by the traveling motor vehicle to the testing body is detected If the detected influence is lower than a predetermined value, then the bridge is safe; and if the detected influence is higher than the predetermined value, then a dangerous bridge message will be produced. As disclosed in U.S. Pat. No. 5,255, 565, a "method and apparatus for monitoring multiple points on a vibrating structure" converts a vibration signal of a bridge into a frequency-domain signal by FFT and calculates the frequency-domain signal to determine whether or not the bridge structure is damaged. As disclosed in Japan Pat. Publication No. 06094583, a "method for inspecting fixed condition or bridge pier and its device" comprising a plurality of sensors installed in both horizontal and vertical directions of a bridge pier, and a FFT is used for detecting the center of oscillation when the bridge pier vibrates, so as to determine whether or not the bridge pier is damaged.

Most of the aforementioned prior arts disclose a way of detecting vibrations of a structure by using a plurality of sensors, and after a fast Fourier transform (FFT) or another equivalent method is used for converting a vibration signal into a frequency-domain signal, the frequency-domain signal is used for evaluating the safety of the structure.

The aforementioned inventions have the following blind spots:

1. The measuring object is limited to a single component of a structure only, but the safety of a whole structure with deteriorated surfaces cannot be determined.
2. The major issue of the practical application of the aforementioned prior art is that the accuracy of measurements at site cannot be integrated with the structure, since the behaviors of the structure are unknown.
3. The structural analysis is carried out by converting the measurement results obtained by the prior art from a vibration signal into a frequency domain by a FFT or any other equivalent method, without mentioning how to overcome the signal distortion problem.
4. In the aforementioned prior arts, the evaluation of a measuring object is limited to a single evaluation method only, and the long-term trend of the structure cannot be controlled. In the meantime, if the structure has encountered disasters for several times, the actual critical condition of the structure cannot be reflected effectively for capturing and analyzing a full time-domain signal.

In view of the drawbacks of the prior art, the inventor of the present invention based on years of experience in the related industry to conduct extensive research and experiments, and finally designed a method for analyzing structure safety to overcome the aforementioned drawbacks.

SUMMARY OF THE INVENTION

It is a primary objective of the present invention to provide a method for analyzing structure safety, and the method integrates a vibration measurement and a time-domain signal spectrum to capture physical characteristics of the spectrum and simulate a disaster situation by calibrating the mutual feedback of a structural model, and obtain the critical force exertion and the deformation scale of the structure to evaluate the safety of the structure.

To achieve the foregoing objective, the present invention provides a method for analyzing structure safety, comprising the steps of: (a) installing a plurality of vibration sensors to a testing structure; (b) using the plurality of vibration sensors to perform an initial vibration measurement to the testing structure and create basic information; (c) capturing a continuous time-domain vibration signal of the testing structure, and converting the continuous time-domain vibration signal into a frequency-domain vibration signal by a fast Fourier transform; (d) converting the continuous time-domain vibration signal into a frequency-domain vibration signal by a fast Fourier transform, (e) filtering the frequency-domain vibration signal to determine an analyzing frequency range; and (f)

analyzing the frequency-domain vibration signal in a fixed time interval by using a moving average method, and completing the safety analysis of the testing structure.

Other possible systems, methods, features and advantages of the present invention will become apparent to those skilled in the art from the detailed description of the preferred embodiments together with the illustration of related drawings as follows:

DETAILED DESCRIPTION OF THE PREFERRED EMBODIMENTS

Figure 1:
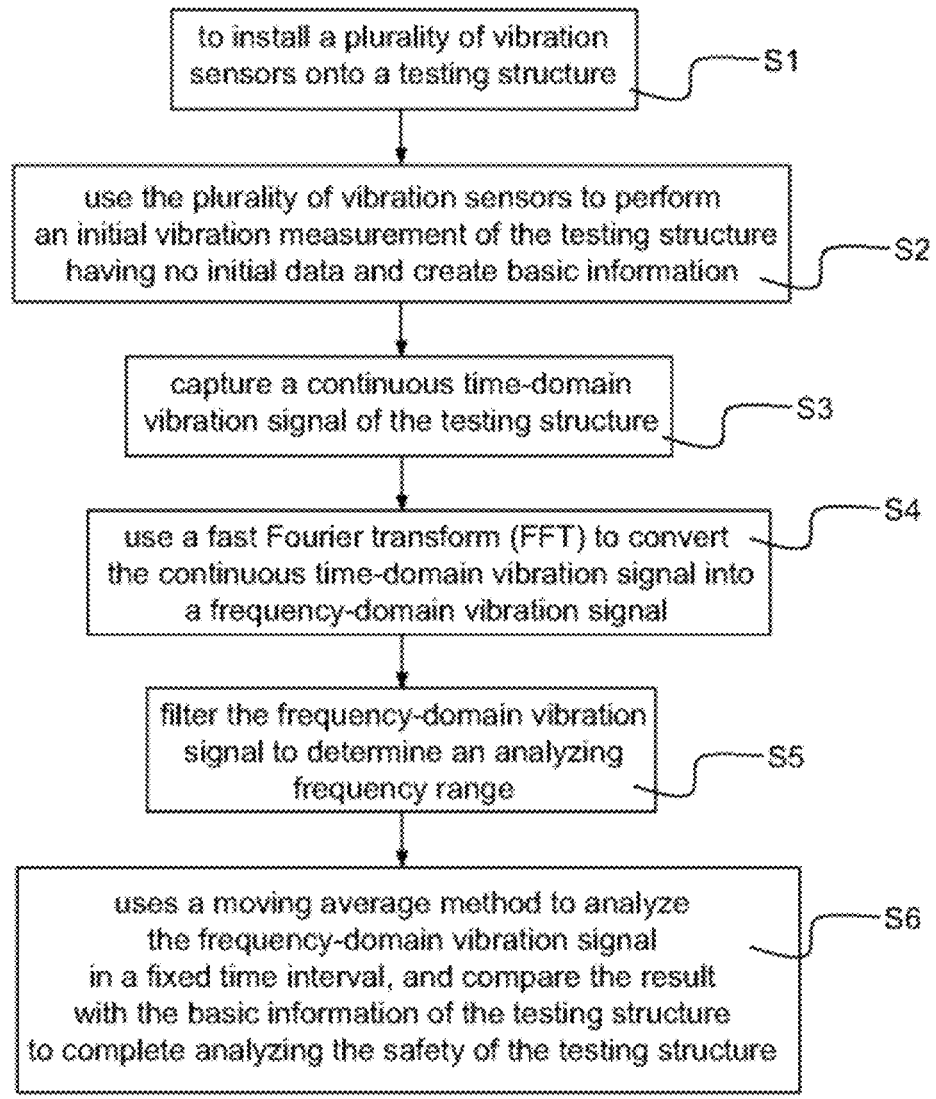
FIG. 1 is a flow chart of a method for analyzing structure safety of the present invention.

With reference to FIG. 1 for a flow chart of a method for analyzing structure safety of the present invention, if basic information including the vibration frequency and the mode of a structure are created at the beginning of constructing the structure, the basic information can be used as initial data of the structural frequency. For existing structures without initial data, it is necessary to inspect the structure to create the initial vibration information used as a reference point for subsequent long-term monitoring processes. Regardless of a newly-built or existing structure, it is necessary to install a plurality of vibration sensors onto a testing structure (Step S1), and use the plurality of vibration sensors to perform an initial vibration measurement of the testing structure having no initial data and create basic information (Step S2). After the structure exists for a long time, the basic information (such as the structural rigidity and migration) may have a slight change, and thus the basic information must be calibrated once again to update the latest basic information of the testing structure.

If an earthquake or any other vibration occurs, the plurality of vibration sensors will capture a continuous time-domain vibration signal of the testing structure (Step S3). The plurality of vibration sensors can transmit the continuous time-domain vibration signal to a host computer of a monitoring center via a cable or wireless transmission, and the host computer of the monitoring center will use a fast Fourier transform (FFT) to convert the continuous time-domain vibration signal into a frequency-domain vibration signal (Step S4), and filter the frequency-domain vibration signal to determine an analyzing frequency range (Step S5). Finally, the host computer of the monitoring center uses a moving average method to analyze the frequency-domain vibration signal in a fixed time interval, and compare the result with the basic information of the testing structure to complete analyzing the safety of the testing structure (Step S6).

In Step S1, the vibration sensors are preferably installed at positions with a significant vibration mode of the testing structure, such as a bridge, and the mid-point of the bridge deck is generally the position with the maximum vibration, but the property of reflecting the vibration at the mid-point of the bridge deck is usually controlled by the local vibration mode of the bridge deck and unable to show the situation of the foundation of a bridge pier, and the vibration at the position of a cap beam corresponding to each bridge pier or an expansion joint of the bridge deck above the cap beam directly reflects the property of the bridge pier to a soil interaction system, so that it can show the situation of the foundation of the bridge pier better. Therefore, the vibration sensors are generally installed on the structure, between components, and positions with larger vibrations. If a change of basic information is found in subsequent tests, the current health condition can be determined. At the early stage of the analysis, the initial vibration should be measured first, and the basic information should be created to serve as a reference of the structural model. Thereafter, measurements are taken on a regular basis such as each year (or a specific time) to correct the structural model and inspect the health condition of the bridge.

In Step S5, a window function is provided for reducing the Gibbs phenomenon of the frequency-domain vibration signal caused by cutting off the continuous time-domain vibration signal. Since most responses to the vibration of the testing structure are low-frequency response, therefore the present invention usually adopts a high-pass filter, a broadband filter (including a bandpass filter and a bandstop filter) to specify the analyzing frequency range.

In Step S6, a moving average technique is used to subdivide the analyzing time interval into fixed time intervals and average the fixed time intervals for the analysis of the frequency-domain vibration signal in order to prevent significant distortions of the frequency of the structure due to human negligence on the selection of the analyzing time interval. This moving average technique can improve the human error of an improper selection, and its advantage is to eliminate the wrong main frequency portion by averaging the time intervals, so as to show the actual significant frequency of the structure. Finally, the moving average spectrum of each time interval is created, and the fist three largest frequency pairs (including frequency and relative amplitude) of the amplitudes within the fixed frequency range are taken and averaged to plot a frequency versus time graph of the maximum value and critical value for analyzing the safety of the testing structure.

Figure 2:
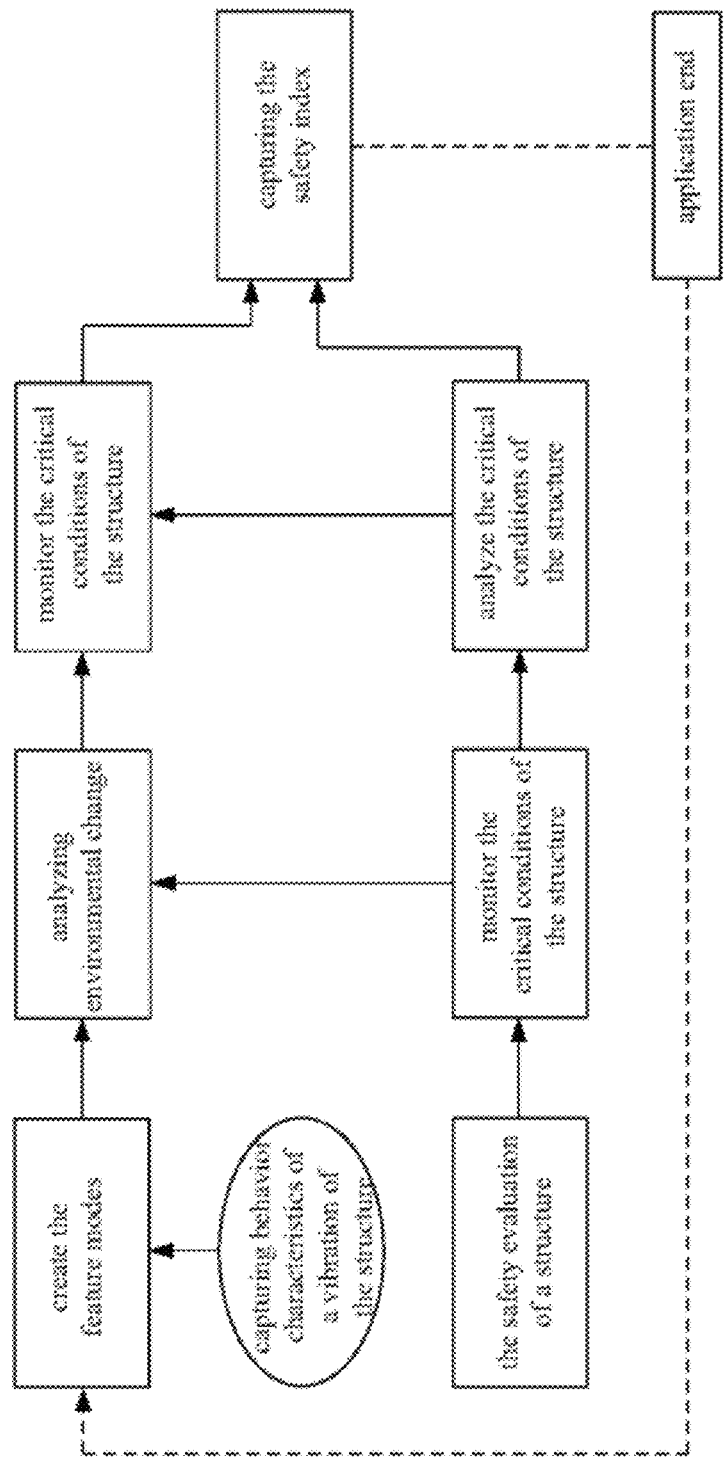
FIG. 2 is a block diagram of a method for analyzing structure safety of the present invention.

With reference to FIG. 2 for a block diagram of a method for analyzing structure safety in accordance with the present invention, the procedure of the method of the present invention comprises the steps of: feeding back a structure model by using a vibration measurement, capturing behavior characteristics of a vibration of the structure, analyzing a signal by processing the dynamically captured time-domain signal, simulating and analyzing the situation of the structure model, and finally capturing the safety index of the structural stability to evaluate the safety of the structure. The aforementioned vibration measurement method is used to create feature modes of different structures, and the numerical values of the structures are used for analyzing and correcting the model to simulate the behavior characteristics of the structure. And then, different positions, force exertions and deformations of the structure are used to learn the response in the vibration spectrum, so as to obtain the time related frequency spectrum characteristic response and establish the structural behavior characteristic index to evaluate the overall safety conditions of the structure. In a dynamic retrieval method, a frequency versus time graph of a spectrum is analyzed to monitor the critical conditions of the structure (such as the critical erosion depth of a bridge and the soundness of a structure). The method is applied to the long-term monitoring and safety evaluation of various structures, and the determination and evaluation of an abnormal condition of a rail structure. When vibrations occur, the signal amplitude of the measured results is used to determine the magnitude of external forces exerted onto the structure and the environmental change.

The features of the present invention include:

a. The measuring object can be any structure of civil engineering facilities, and a traveling motor vehicle (such as a car on a bridge or mass rapid transit) or a slight environmental vibration (such as the vibrations occurred at side slopes or water facilities) serves as a vibration source to overcome the problems of the conventional vibration measurement including the small scale of the vibration source, the insufficient energy, and the difficulty of maintaining a stable operation.

b. The mutual feedback of the calibration of the structural model is used to simulate the disaster situation and calculate the critical force exerted on a structure and the deformation scale of the structure, so as to evaluate the safety of the structure. The actual and practical structure vibration behaviors are combined, and the structure safety index is calculated to match with the structure critical index of the actual site.

c. The measurement results are analyzed directly by converting the vibration signal into the frequency-domain signal by a FFT or another equivalent method, and the dynamic capture method is provided for analyzing the relation of frequency versus time, so as to avoid the signal distortion problem. In addition, the mode signals generated by the structural model are fed back to provide the physical significance of the result of the signals, so as to avoid the physical non-significance of the conventional signals.

d. The continuous full time-domain signals capture technology can avoid the deficiency of the single measurement that cannot represent the overall structural behavior.

e. The scope of applicability of the invention is broad, since the measurement results can be directly applied to multi-hazards evaluation of a structure, such as an environmental change and a structural stability monitoring of a structure at regular time, a long-term health monitoring of a structure, a typhoon or heavy rain real-time monitoring and warning system, a determination on the recovery of stability of a post-incident structure, the safety evaluation of a structure with multi-hazards, and a long-term monitoring, evaluation, maintenance and management of the behaviors of a structure, etc.

Figure 3:
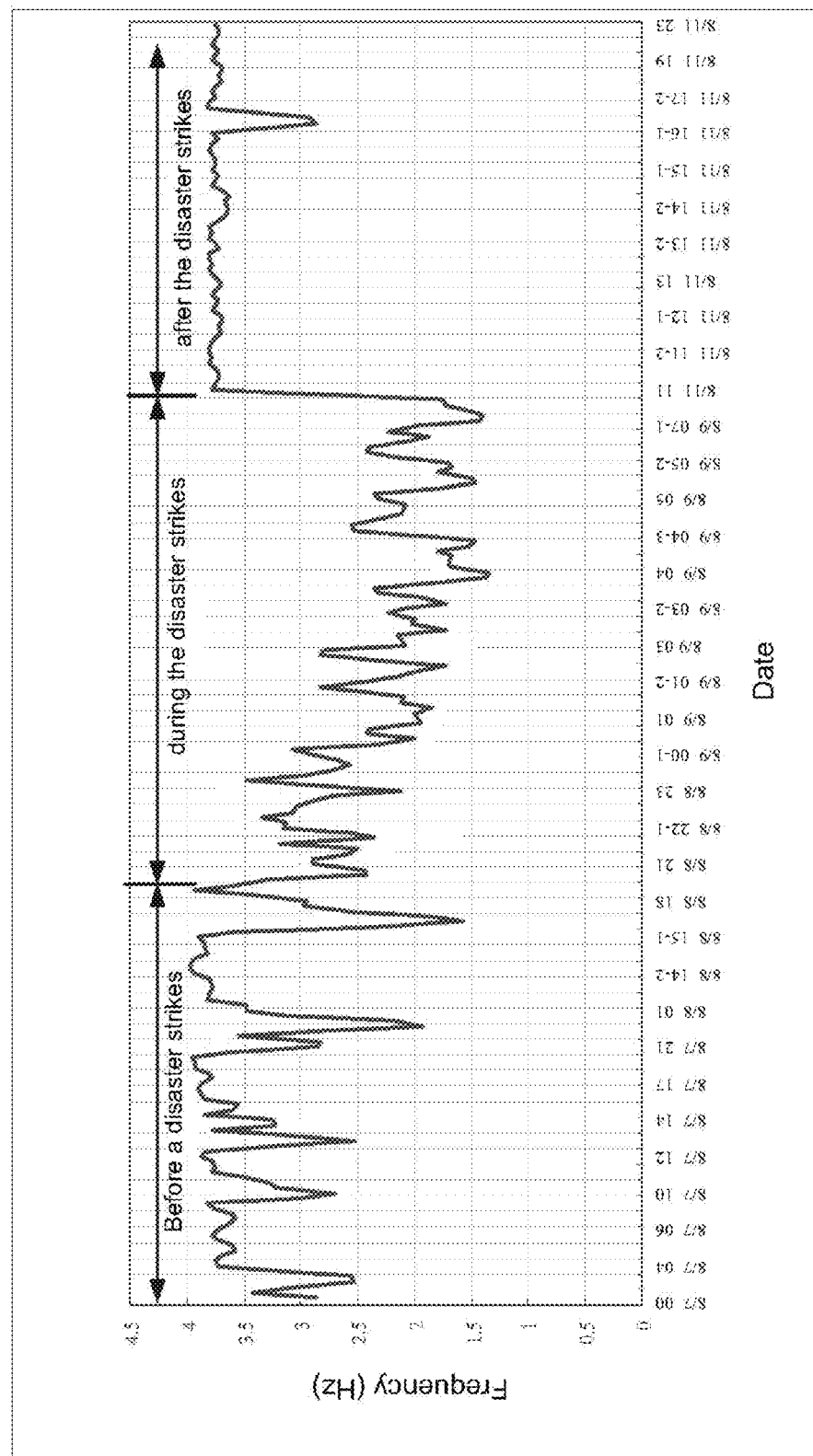
FIG. 3 is a graph of frequency versus time of a testing structure measured before, during and after a disaster by an analyzing procedure of the present invention.
Figure 4:
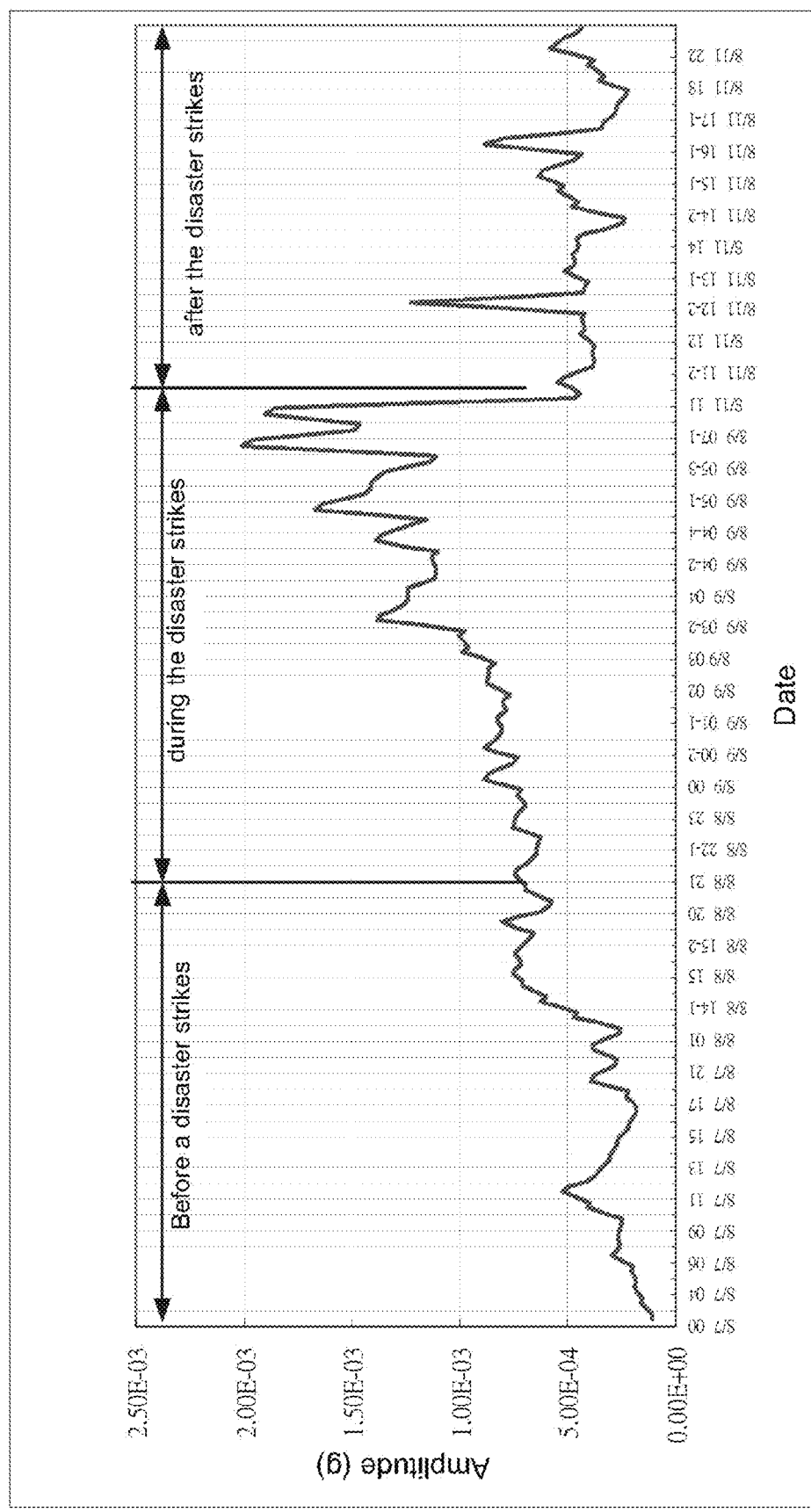
FIG. 4 is a graph of amplitude versus time of a testing structure measured before, during and after a disaster by an analyzing procedure of the present invention.

With the aforementioned step, the vibration measurement results are used for plotting a frequency versus time graph and an amplitude versus time graph of data measured at site for a long time. When a structure is damaged by external forces, the stiffness of the structure is changed, and the change of stiffness shown at the appearance of the structure most significantly relates to the vibration frequency of the structure. Therefore, when there is an abnormal change of the vibration frequency of the structure (or an increase or decrease of frequency), and such change of frequency occurs continuously for some time, we can determine whether or not there is a safety concern. The at-site test results are shown in FIGS. 3 and 4, wherein FIG. 3 shows a graph of frequency versus time of a testing structure measured before, during and after a disaster by an analyzing procedure of the present invention, and FIG. 4 shows a graph of amplitude versus time of a testing structure measured before, during and after a disaster by an analyzing procedure of the present invention. The analysis results of the present invention are used for plotting the frequency versus time graph. Before a disaster strikes, the structure frequency is higher. When the disaster is striking, external forces are increased, and the amplitude increases with time, and the frequency decreases with time. After the disaster is gone, the amplitude and frequency of the structure return to normal. The aforementioned results helps us know whether or not there is any damage of the structure occurred during the disaster, the level of the damage, the possible position of the damage, and the time lag of early warning.

If the structure is damaged, the stiffness decreases, and the natural frequency also decreases. Since the number of cracks increases or the strain becomes larger, the damping will increase. In addition, the stiffness of the system will be re-allocated due to the damage, and the vibration mode will be changed. After the characteristic (eigen) value of the valid spectrum of the structure is captured, it is necessary to add a numerical model for the critical analysis to determine whether or not the structure is dangerous.

Since it is not easy to know the actual environmental conditions of the site thoroughly and control the properties of each kind of vibration sources, the measured vibration data obtained from different places at different time cannot be used for a direct comparison. Therefore, the aforementioned way of obtaining the signal can be used for summarizing and clarifying the properties of different kinds of vibration sources. In addition to its use as a reference for the vibration data analysis and determination, the method can be as a basis for determination basis for automatically capturing and selecting data during a real-time monitoring process. The aforementioned numerical model of the structure can be used for detecting the damage situations of a structure in different types of disasters to provide a reference for the threshold of the safety evaluation.

If the structure is changed by external forces, the frequency will be changed abnormally, and the continuous time of the occurrence indicates such frequency change. When the frequency is increased or decreased, the magnitudes of the time domain and frequency domain are changed, the structure is displaced, the threshold of the numerical model is determined, the multiple of indexes can be used to summarize and evaluate whether or not a structure has safety concerns. The aforementioned indexes are called characteristic indexes, and an intelligent sensor can be designed for evaluating a structure after a disaster strikes the structure. The design must take the requirements on the physical magnitude, the range, and the measurement precision of the structure into consideration to obtain effective characteristic responses of the structural spectrum.

While the invention has been described with reference to a preferred embodiment thereof, it is to be understood that modifications or variations may be easily made without departing from the spirit of this invention, which is defined in the appended claims.

We claim:

1. A method for analyzing structure safety, comprising the steps of:

(a) installing a plurality of vibration sensors to a testing structure;

(b) using the plurality of vibration sensors to perform an initial vibration measurement to the testing structure and create basic information;

(c) capturing a continuous time-domain vibration signal of the testing structure, and converting the continuous time-domain vibration signal into a frequency-domain vibration signal by a fast Fourier transform, and then reducing Gibbs phenomenon induced in the frequency-domain vibration signal by applying a window function to the frequency domain vibration signal;

(d) filtering the frequency-domain vibration signal to determine an analyzing frequency range by using a filter;
(e1) obtaining top three characteristic frequencies from the analyzing frequency range;
(e2) graphing a moving frequency spectrum plot of the top three characteristic frequencies, wherein Y-coordinate of the moving frequency spectrum plot is the Frequency and X-coordinate of the moving frequency spectrum plot is Time; and
(e3) evaluating a structural safety of the testing structure by observing the moving frequency spectrum plot and determining whether the variations exceed a critical value.

2. The method for analyzing structure safety according to claim 1, wherein the plurality of vibration sensors described in the step (b) transmit the continuous time-domain vibration signal to a host computer of a monitoring center via a cable or wireless transmission.

3. The method for analyzing structure safety according to claim 1, wherein the filter the step (d) is selected from the group consisting of: a high-pass filter and a broadband filter.

* * * * *